(12) United States Patent
Danielson et al.

(10) Patent No.: US 8,713,967 B2
(45) Date of Patent: May 6, 2014

(54) STABLE GLASS SHEET AND METHOD FOR MAKING SAME

(75) Inventors: Paul Stephen Danielson, Corning, NY (US); Adam James Ellison, Painted Post, NY (US); Timothy J Kiczenski, Corning, NY (US)

(73) Assignee: Corning Incorporated, Corning, NY (US)

(*) Notice: Subject to any disclaimer, the term of this patent is extended or adjusted under 35 U.S.C. 154(b) by 709 days.

(21) Appl. No.: 12/357,441

(22) Filed: Jan. 22, 2009

(65) Prior Publication Data

US 2010/0126221 A1    May 27, 2010

Related U.S. Application Data

(60) Provisional application No. 61/116,673, filed on Nov. 21, 2008.

(51) Int. Cl.
*C03B 17/06* (2006.01)
*C03B 27/00* (2006.01)

(52) U.S. Cl.
USPC .................................. 65/95; 65/90

(58) Field of Classification Search
USPC ............... 65/90–101, 69, 104, 114–118, 194, 65/370.1
See application file for complete search history.

(56) References Cited

U.S. PATENT DOCUMENTS

| | | | |
|---|---|---|---|
| 2,961,328 A | 11/1960 | Babcock et al. | 106/52 |
| 3,268,315 A * | 8/1966 | Stookey | 65/33.5 |
| 3,338,696 A | 8/1967 | Dockerty | 65/145 |
| 3,682,609 A * | 8/1972 | Dockerty | 65/83 |
| 3,847,582 A * | 11/1974 | Kozmin | 65/33.3 |
| 3,875,766 A * | 4/1975 | French | 65/97 |
| 3,883,339 A * | 5/1975 | Michalik et al. | 65/114 |
| 3,928,013 A * | 12/1975 | French | 65/97 |
| 3,930,828 A * | 1/1976 | Kunkle | 65/99.3 |
| 4,394,453 A | 7/1983 | Dumbaugh, Jr. | 501/66 |

(Continued)

FOREIGN PATENT DOCUMENTS

| | | | | |
|---|---|---|---|---|
| DE | 4213579 | 10/1992 | | C03C 3/087 |
| DE | 19601922 | 5/2001 | | C03C 3/093 |

(Continued)

OTHER PUBLICATIONS

Lapp, Joseph C. "AMLCD Substrate Trends in Technology" Copyright Corning Incorporated, Corning NY 2004.*

(Continued)

*Primary Examiner* — Jodi C Franklin
(74) *Attorney, Agent, or Firm* — Matthew J. Mason; Steven S. Wentsler; Thomas R. Beall

(57) ABSTRACT

A process for making glass sheet with low compaction suitable for high temperature applications, such as low-temperature polysilicon-based TFT displays, and glass sheets thus made. The glass sheet desirably has an anneal point of at least 765° C., a CTE at most $42 \times 10^{-7}/°$ C. The process involves cooling the glass melt form a temperature corresponding to a viscosity of $1.0 \times 10^{10}$ poise to a temperature corresponding to a viscosity of $1.0 \times 10^{15}$ poise at a cooling rate CR, where CR≥5° C./second. The absolute value of the measured compaction of the glass sheet desirably is at most 175 ppm upon being re-heated to 675° C. for a period of time.

18 Claims, 2 Drawing Sheets

(56) References Cited

U.S. PATENT DOCUMENTS

| | | | | |
|---|---|---|---|---|
| 4,634,683 | A | | 1/1987 | Dumbaugh, Jr. .............. 501/32 |
| 4,634,684 | A | * | 1/1987 | Dumbaugh, Jr. .............. 501/69 |
| 4,666,868 | A | | 5/1987 | Dumbaugh, Jr. .............. 501/32 |
| 4,666,869 | A | | 5/1987 | Dumbaugh, Jr. .............. 501/32 |
| 5,116,787 | A | | 5/1992 | Dumbaugh, Jr. .............. 501/66 |
| 5,116,788 | A | | 5/1992 | Dumbaugh, Jr. .............. 501/66 |
| 5,116,789 | A | | 5/1992 | Dumbaugh et al. ........... 501/66 |
| 5,326,730 | A | | 7/1994 | Dumbaugh et al. ........... 501/69 |
| 5,374,595 | A | * | 12/1994 | Dumbaugh et al. ........... 501/66 |
| 5,489,558 | A | | 2/1996 | Moffatt et al. ................. 501/69 |
| 5,506,180 | A | | 4/1996 | Ponthieu ........................ 501/66 |
| 5,508,237 | A | | 4/1996 | Moffatt et al. ................. 501/69 |
| 5,597,395 | A | * | 1/1997 | Bocko et al. ................. 65/33.4 |
| 5,674,304 | A | * | 10/1997 | Fukada et al. ................ 65/32.4 |
| 5,741,746 | A | | 4/1998 | Kohli et al. ..................... 501/70 |
| 5,770,535 | A | | 6/1998 | Brix et al. ....................... 501/67 |
| 5,801,109 | A | | 9/1998 | Nishizawa et al. ............ 501/66 |
| 5,824,127 | A | * | 10/1998 | Bange et al. ..................... 65/90 |
| 5,851,939 | A | | 12/1998 | Miwa ............................. 501/70 |
| 6,060,168 | A | | 5/2000 | Kohli ............................ 428/428 |
| 6,096,670 | A | | 8/2000 | Lautenschläger et al. ..... 501/67 |
| 6,319,867 | B1 | * | 11/2001 | Chacon et al. ................. 501/66 |
| 6,329,310 | B1 | | 12/2001 | Peuchert et al. ............... 501/66 |
| 6,418,754 | B1 | * | 7/2002 | Nitschke et al. ............... 65/111 |
| 6,986,268 | B2 | * | 1/2006 | Lee ................................... 65/95 |
| 7,189,672 | B2 | | 3/2007 | Aitken et al. ................... 501/63 |
| 7,207,193 | B2 | * | 4/2007 | Xun et al. ......................... 65/95 |
| 7,323,426 | B2 | | 1/2008 | Aitken ............................ 501/63 |
| 7,418,308 | B2 | * | 8/2008 | Allan et al. .................... 700/157 |
| 2002/0023463 | A1 | * | 2/2002 | Siebers et al. ............... 65/99.5 |
| 2003/0032542 | A1 | * | 2/2003 | Endo ............................... 501/69 |
| 2004/0029702 | A1 | | 2/2004 | Naumann et al. .............. 501/70 |
| 2004/0043887 | A1 | | 3/2004 | Paulson ........................... 501/66 |
| 2005/0026767 | A1 | * | 2/2005 | Takase et al. ................... 501/56 |
| 2005/0096777 | A1 | * | 5/2005 | Allan et al. .................... 700/157 |
| 2005/0183455 | A1 | * | 8/2005 | Pitbladdo ...................... 65/29.11 |
| 2005/0209084 | A1 | * | 9/2005 | Takaya et al. ................... 501/11 |
| 2007/0015653 | A1 | * | 1/2007 | Lautenschlaeger et al. .... 501/68 |
| 2007/0022780 | A1 | * | 2/2007 | House et al. ................. 65/29.21 |
| 2007/0042894 | A1 | | 2/2007 | Aitken et al. ................... 501/64 |
| 2007/0130994 | A1 | * | 6/2007 | Boratav et al. ............... 65/29.21 |
| 2007/0190340 | A1 | | 8/2007 | Coppola et al. .............. 428/432 |
| 2007/0191207 | A1 | * | 8/2007 | Danielson et al. ............. 501/66 |
| 2007/0220920 | A1 | * | 9/2007 | Allaire et al. ................ 65/29.12 |
| 2008/0110208 | A1 | * | 5/2008 | Ellison ............................. 65/90 |
| 2008/0184741 | A1 | * | 8/2008 | Mueller et al. .............. 65/29.14 |
| 2009/0100873 | A1 | * | 4/2009 | Allan et al. ....................... 65/85 |
| 2009/0133441 | A1 | * | 5/2009 | Ellison ............................. 65/90 |
| 2009/0170684 | A1 | * | 7/2009 | Kato et al. ..................... 501/66 |
| 2009/0226733 | A1 | * | 9/2009 | Kato et al. ................... 428/428 |
| 2009/0235693 | A1 | * | 9/2009 | Kojima ............................ 65/90 |
| 2009/0286091 | A1 | * | 11/2009 | Danielson et al. ............ 428/426 |
| 2010/0126221 | A1 | * | 5/2010 | Danielson et al. ................ 65/95 |
| 2011/0048074 | A1 | * | 3/2011 | Danielson et al. ................ 65/90 |

FOREIGN PATENT DOCUMENTS

| | | | |
|---|---|---|---|
| EP | 0 672 629 | 9/1995 | ............. C03C 3/085 |
| EP | 0 714 862 | 3/1999 | ............. C03C 3/085 |
| EP | 0 576 362 | 8/1999 | ............. C03C 3/091 |
| EP | 1970354 A1 * | 9/2008 | ............. C03B 17/06 |
| FR | 2675795 | 10/1992 | ............. C03C 3/091 |
| GB | 479173 | 1/1938 | |
| JP | 59190240 A * | 10/1984 | ............. C03C 17/34 |
| JP | 07-277763 | 10/1995 | ............. C03C 3/091 |
| JP | 09-048632 | 2/1997 | ............. C03C 3/091 |
| JP | 09-110460 | 4/1997 | ............. C03C 3/115 |
| JP | 2644622 | 5/1997 | ............. C03C 3/091 |
| JP | 09-156953 | 6/1997 | ............. C03C 3/091 |
| JP | 10-025132 | 1/1998 | ............. C03C 4/20 |
| JP | 10-072237 | 3/1998 | ............. C03C 3/091 |
| JP | 10-114538 | 5/1998 | ............. C03C 3/091 |
| JP | 10-130034 | 5/1998 | ............. C03C 3/091 |
| JP | 10-139467 | 5/1998 | ............. C03C 3/078 |
| JP | 10-231139 | 9/1998 | ............. C03C 3/093 |
| JP | 10-324526 | 12/1998 | ............. C03C 5/225 |
| JP | 2871163 | 1/1999 | ............. C03C 3/091 |
| JP | 11-043350 | 2/1999 | ............. C03C 4/00 |
| JP | 11-292563 | 10/1999 | ............. C03C 3/091 |
| JP | 2001192217 A * | 7/2001 | ............. C03B 17/06 |
| JP | 2002-003240 | 1/2002 | ............. C03C 3/093 |
| WO | WO 97/11919 | 4/1997 | ............. C03C 3/091 |
| WO | WO 97/11920 | 4/1997 | ............. C03C 3/091 |
| WO | 98/27019 | 6/1998 | ............. C03C 3/091 |
| WO | WO 2005055284 A2 * | 6/2005 | |

OTHER PUBLICATIONS

Corning Vycor 7913, "UGG manufactures of optical components and technical glasses" as viewed on Aug. 30, 2011 at http://web.archive.org/web/20070104040916/http://www.uqgoptics.com/materials_commercial_corning_vycor7913.asp and dated back to Jan. 4, 2007 using the Internet Archive Wayback Machine at http://web.archive.org.*

VYCOR® Brand Porous Glass 7930 Corning © 2001 Corning Incorporated as viewed at http://www.corning.com/docs/specialtymaterials/pisheets/Vycor%207930.pdf on Mar. 12, 2012.*

VYCOR® Glass 7913 Properties as viewed at http://www.corning.com/docs/specialtymaterials/pisheets/Vycor%207930.pdf on Mar. 12, 2012.*

VYCOR® Glass 7913 Properties as viewed at http://catalog2.corning.com/Lifesciences/media/pdf/Description_of_VYCOR_Code_7913.pdf on Apr. 1, 2012.*

* cited by examiner

US 8,713,967 B2

STABLE GLASS SHEET AND METHOD FOR MAKING SAME

CROSS-REFERENCE TO RELATED APPLICATION

This application claims the benefit of priority to U.S. Provisional Patent Application No. 61/116,673, filed on Nov. 21, 2008, the content of which is relied upon and incorporated herein by reference in its entirety.

TECHNICAL FIELD

The present invention relates to glass materials and processes for making such glass materials. In particular, the present invention relates to glass materials having a high strain point and low compaction. The present invention is useful, e.g., in making high-strain-point, low-compaction glass sheets suitable for making glass substrates for display devices based on low temperature polysilicon technology.

BACKGROUND

When glass melt is cooled rapidly from high temperature, the movement of atoms within the cooling liquid slows down with decreasing temperature and eventually diminishes to oscillations about fixed positions due to normal thermal population of vibrational states. These positions are typically not those that would be adopted were the glass to be held for an extended period of time (ranging from seconds to days) at intermediate temperatures (e.g., the glass transition temperature or the strain or anneal points). As a consequence, when a rapidly quenched glass is reheated to intermediate temperatures, the thermally-populated vibrational states allow for relaxation of atoms into positions that better satisfy their individual and collective bonding requirements. Since this is typically accompanied by an irreversible decrease in the physical dimensions of a bulk piece of glass, thermal relaxation upon reheating is said to produce compaction of the glass.

A typical low-temperature polysilicon (LTPS) process includes steps that raise the glass substrate temperature to 600° C. or more. This is close to the strain point of typical active matrix LCD (AMLCD) display substrates, and thus without an intermediate annealing step these glasses will substantially compact in the low-temperature polysilicon process. This is highly undesirable, as it severely impacts the registry of pixels between the TFT and color filter sheets, and also can impact the performance of the TFTs themselves.

It has been found that certain glass sheets made by fusion down-draw processes that are suitable for TFT displays based on amorphous silicon technology exhibited too large a compaction to be used for those based on LTPS technology. Therefore, there exists a genuine need for a glass sheet with a pristine surface suitable as glass substrates for LTPS TFT display fabrication, and an economical process for making such glass sheets.

The present invention satisfies this need.

SUMMARY

According to a first aspect of the present invention, provided is a process for making a glass sheet, comprising the following steps:

(A) providing a glass material having an anneal point of at least 765° C. and a CTE of at most $42 \times 10^{-7}/°$ C.;

(B) heating the glass material to a temperature not lower than a temperature $T_1$ corresponding to a viscosity of $1.0 \times 10^{10}$ poise; and (C) cooling the glass material from $T_1$ to a temperature $T_2$ corresponding to a viscosity of $1.0 \times 10^{15}$ poise at a cooling rate of CR, wherein $CR \geq 5°$ C./s.

In certain embodiments of the process according to the first aspect of the present invention, in step (C), $CR \geq 8°$ C./s, in certain embodiments $CR \geq 10°$ C./s, in certain embodiments $CR \geq 15°$ C./s, in certain embodiments $CR \geq 20°$ C./s, in certain embodiments $CR \geq 25°$ C./s, in certain embodiments $CR \geq 30°$ C./s, in certain embodiments $CR \geq 35°$ C./s, in certain embodiments $CR \geq 40°$ C./s.

In certain embodiments of the process according to the first aspect of the present invention, the glass material, upon completion of step (C), has a measured compaction CM675, wherein $|CM675| \leq 175$ ppm, in certain embodiments $|CM675| \leq 150$ ppm, in certain embodiments $|CM675| \leq 125$ ppm, in certain embodiments $|CM675| \leq 100$ ppm, in certain embodiments $|CM675| \leq 75$ ppm.

In certain embodiments of the process according to the first aspect of the present invention, the glass sheet has a thickness of at most 2.5 mm, in certain embodiments at most 2.0 mm, in certain embodiments at most 1.5 mm, in certain embodiments at most 1.0 mm, in certain embodiments at most 0.7 mm, in certain embodiments at most 0.5 mm, in certain embodiments at most 0.3 mm.

In certain embodiments of the process according to the first aspect of the present invention, the glass material is essentially free of alkali metal in the composition thereof.

In certain embodiments of the process according to the first aspect of the present invention, the process is selected from (i) a fusion draw process, (ii) a float process; (iii) a slot draw process; and (iv) a rolling process. In certain specific embodiments, the process is a fusion draw process.

In certain embodiments of the process according to the first aspect of the present invention, in step (C), $CR \leq 200°$ C./s, in certain embodiments $CR \leq 180°$ C./s, in certain embodiments $CR \leq 150°$ C./s, in certain embodiments $CR \leq 120°$ C./s, in certain embodiments $CR \leq 100°$ C./s, in certain embodiments $CR \leq 80°$ C./s, in certain embodiments $CR \leq 50°$ C./s, in certain embodiments $CR \leq 40°$ C./s, in certain embodiments $CR \leq 30°$ C./s, in certain embodiments $CR \leq 20°$ C./s, in certain embodiments $CR \leq 10°$ C./s.

In certain embodiments of the process according to the first aspect of the present invention, the glass material comprises $SiO_2$ and $Al_2O_3$ in the composition thereof. In certain specific embodiments, the glass material comprises $SiO_2$, $Al_2O_3$ and $B_2O_3$ in the composition thereof. In certain other specific embodiments, the glass material comprises $SiO_2$ and $Al_2O_3$ in the composition thereof, but is essentially free of $B_2O_3$.

According to a second aspect of the present invention, provided is a process for making a glass sheet suitable for forming low-temperature polysilicon TFT thereon, comprising the following steps:

(i) providing a glass melt at a viscosity of at most $1.0 \times 10^{10}$ poise of a glass material having an anneal point of at least 765° C.;

(ii) cooling the glass melt from a temperature $T_1$ corresponding to a viscosity of $1.0 \times 10^{10}$ poise to a temperature $T_2$ corresponding to a viscosity of $1.0 \times 10^{15}$ poise at a cooling rate of CR, wherein $CR \geq 5°$ C./s; and (iii) forming a glass sheet from the glass melt.

In certain embodiments of the process according to the second aspect of the present invention, steps (ii) and (iii) are carried out at least partly simultaneously.

In certain embodiments of the process according to the second aspect of the present invention, in step (i), the glass material provided comprises $SiO_2$ and $Al_2O_3$ in the composition thereof. In certain specific embodiments, the glass material comprises $SiO_2$, $Al_2O_3$ and $B_2O_3$ in the composition thereof. In certain other specific embodiments, the glass material comprises $SiO_2$ and $Al_2O_3$ in the composition thereof, but is essentially free of $B_2O_3$.

In certain embodiments of the process according to the second aspect of the present invention, in step (ii), $CR \geq 10°$ C./s, in certain embodiments $CR \geq 15°$ C./s, in certain embodiments $CR \geq 20°$ C./s, in certain embodiments $CR \geq 25°$ C./s, in certain embodiments $CR \geq 30°$ C./s, in certain embodiments $CR \geq 40°$ C./s, in certain embodiments $CR \geq 50°$ C./s.

In certain embodiments of the process according to the second aspect of the present invention, step (iii) comprises fusion drawing the glass melt into a glass sheet.

In certain embodiments of the process according to the second aspect of the present invention, upon completion of steps (ii) and (iii), the glass sheet has a measured compaction CM675, wherein |CM675|≤175 ppm.

In certain embodiments of the process according to the second aspect of the present invention, in step (ii), $CR \leq 200°$ C./s, in certain embodiments $CR \leq 180°$ C./s, in certain embodiments $CR \leq 150°$ C./s, in certain embodiments $CR \leq 120°$ C./s, in certain embodiments $CR \leq 100°$ C./s, in certain embodiments $CR \leq 80°$ C./s, in certain embodiments $CR \leq 50°$ C./s, in certain embodiments $CR \leq 40°$ C./s, in certain embodiments $CR \leq 30°$ C./s, in certain embodiments $CR \leq 20°$ C./s, in certain embodiments $CR \leq 10°$ C./s.

In certain embodiments of the process according to the second aspect of the present invention, prior to the fabrication of TFT on the sheet surface, the glass sheet is not subjected to a secondary anneal step.

One or more embodiments of the present invention have one or more of the following advantages. First, the glass sheet according to the present invention can have a compaction suitable for the need of a low temperature polysilicon-based TFT display. Second, the relatively high cooling rate enables economic volume production of the glass sheet without sacrificing the compaction property of the glass sheet. Third, the process of the present invention can be applied to a broad spectrum of forming technologies, including but not limited to fusion draw, slot draw, rolling, and the like. Fourth, where fusion draw is employed, thin glass sheet with a pristine glass surface can be produced without the need of further annealing or surface finishing.

Additional features and advantages of the invention will be set forth in the detailed description which follows, and in part will be readily apparent to those skilled in the art from the description or recognized by practicing the invention as described in the written description and claims hereof, as well as the appended drawings.

It is to be understood that the foregoing general description and the following detailed description are merely exemplary of the invention, and are intended to provide an overview or framework to understanding the nature and character of the invention as it is claimed.

The accompanying drawings are included to provide a further understanding of the invention, and are incorporated in and constitute a part of this specification.

DETAILED DESCRIPTION

Figure 1:
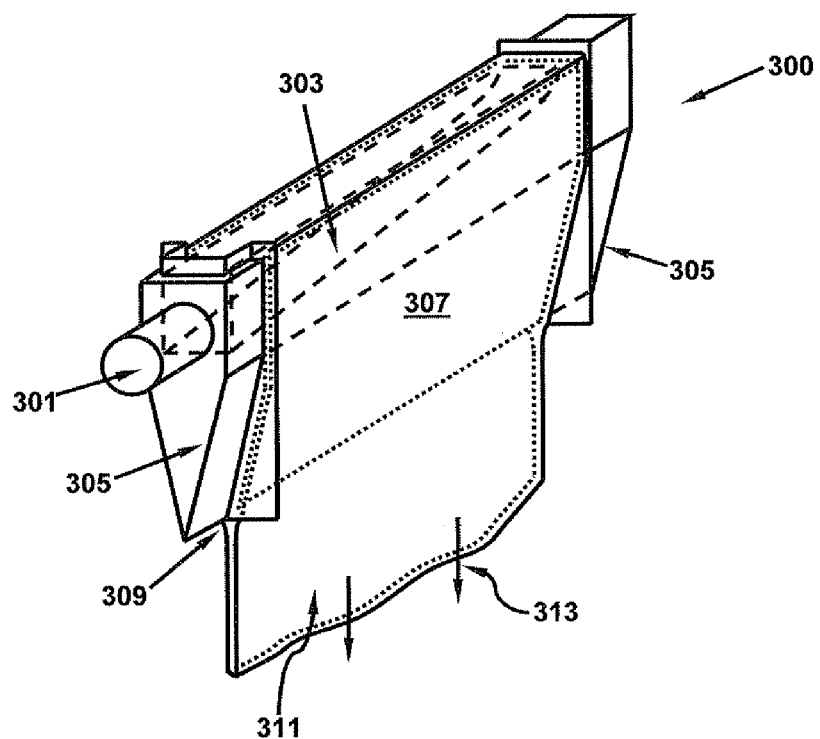
FIG. 1 is a schematic diagram showing a fusion down-draw forming process using an isopipe.

Unless otherwise indicated, all numbers such as those expressing weight percents of ingredients, dimensions, and values for certain physical properties used in the specification and claims are to be understood as being modified in all instances by the term "about." It should also be understood that the precise numerical values used in the specification and claims form additional embodiments of the invention. Efforts have been made to ensure the accuracy of the numerical values disclosed in the Examples. Any measured numerical value, however, can inherently contain certain errors resulting from the standard deviation found in its respective measuring technique.

As used herein, in describing and claiming the present invention, the use of the indefinite article "a," or "an" means "at least one," and should not be limited to "only one" unless indicated to the contrary. Thus, for example, reference to "a glass square" includes embodiments having two or more such squares, unless the context clearly indicates otherwise.

As used herein, a "wt %" or "weight percent" or "percent by weight" of a component, unless specifically stated to the contrary, is based on the total weight of the composition or article in which the component is included.

As used herein, "alkali-free" means the glass composition comprises at most 0.1 wt % of alkali oxides in total. Alkali-free glass compositions are desired for glass substrates on which electronic components, such as thin-film transistors (TFTs), are directly fabricated.

"Coefficient of thermal expansion" and "CTE" are used interchangeably herein, which mean linear coefficient of thermal expansion of the relevant material from 25° C. to 300° C. In the present application, CTE is measured using conventional equipment and methods, such as ASTM E228-06 Standard Test Method for Linear Thermal Expansion of Solid Materials With a Push-Rod Dilatometer.

In the present application, the anneal point of a glass material is measured using conventional equipment and methods, e.g., ASTM C336-71 (2005) Standard Test Method for Annealing Point and Strain Point of Glass by Fiber Elongation.

Beam Bending Process for Making Viscosity

Cooling rate (CR) from the temperature $T_1$ corresponding to a viscosity of $10^{10}$ poise to the temperature $T_2$ corresponding to a viscosity of $10^{15}$ poise is defined as the average cooling rate during this process. Thus:

$$CR = \frac{T_1 - T_2}{t},$$

where t is the duration of cooling in seconds, $T_1$ and $T_2$ are in ° C. and CR is thus in ° C./second (° C./s). The temperature profile in this viscosity range can vary. Thus, in this stage of cooling from $T_1$ to $T_2$, the temperature may, e.g., decrease linearly over time in certain embodiments, or be held constant at a given temperature between $T_1$ and $T_2$ for a given period of time in certain other embodiments.

In the present application, compaction of a glass is measured by the following protocol. A precise glass square of size 4"×4" and about 1 mm or less thick is made. Four fiducial lines are scribed about 0.5 inches in from the sample's edges. The X and Y coordinates of the intersections of these lines in each corner of the sample are located using a Mitutoyo Apex Vision System and are used to calculate the perimeter of the sample. The marked glass is then immediately placed into a furnace having a constant temperature of 675° C. and held in the furnace for a period of 30 minutes. Thereafter, the glass sheet is taken out of the furnace and cooled rapidly to lower than 100° C. in less than 3 minutes. The positions of the registry marks are re-measured at around room temperature. Compaction (CM675) in ppm is defined as $$CM675 = \frac{P_2 - P_1}{P_1} \times 10^6,$$

where P1 is the initial perimeter of the scribed square at room temperature before the thermal treatment; and P2 is the final perimeter of the scribed square at room temperature after the thermal treatment. |CM675| means the absolute value of the measured compaction irrespective of the sign thereof.

The invention described herein includes a process wherein an alkali-free glass with an anneal point of 765° C. or more and a coefficient of thermal expansion at most $42\times10^{-7}$/° C. is formed into sheet such that the cooling rate from approximately $1.0\times10^{10}$ poise to $1.0\times10^{15}$ poise is about 5° C./second or higher. When a glass satisfying these attributes and cooled at this rate is measured for CM675 according to the protocol described supra, the resulting |CM675| will be at most 175 ppm. The glass produced by this process that shows less than 175 ppm compaction is suitable for use as a low-temperature polysilicon substrate without a costly secondary annealing step.

The process of the present invention for making the glass sheet according to the present invention may be selected from, inter alia, a fusion draw process, a slot draw process, a rolling process, a sheet re-draw process, and a float process. Thus, the specific forming technology used is not critical for the present invention. For example, the glass sheet according to the present invention can be made by casting molten glass into a sheet shape, followed by thinning and polishing. In addition, the glass sheet made by any of the above processes may be further cut, thinned, ground, and/or polished or otherwise finished, without departing from the scope and spirit of the present invention as claimed. The discovery of the unique and interesting anneal-point/compaction/cooling-rate correlation is the basis of the present invention. The present invention will be further illustrated in greater detail in the context of fusion down draw forming process. However, one having ordinary skill in the art understands that, in light of the teachings in the present application, the present invention can be adapted for use in other glass sheet forming technologies.

FIG. 1 schematically illustrates the equipment set-up 300 of a fusion down draw process for making glass sheets. In this process, a glass melt is introduced through an inlet 301 into an isopipe comprising a trough 303 and a wedge 305. The glass melt, once it fills the trough 303, flows over the two sides (called weirs), down over the two sides 307 of the wedge, and combines at the end 309 of the wedge (called root) to form a single glass sheet 311, which is further drawn down along direction 313, and then cooled, cut and finished to the final glass sheet product. During this forming stage, including the glass overflow, downflow, sheet formation and sheet drawing, the temperature of the glass melt is allowed to decrease, and the viscosity of the glass melt is allowed to increase from below $1.0\times10^{10}$ poise to over $1.0\times10^{15}$ poise. At a given glass width and yield, the higher the drawing rate of the process, the higher the productivity. The drawing rate of the process is partly determined by the cooling rate (CR) during the $1.0\times10^{10}$ poise to $1.0\times10^{15}$ poise viscosity range. To enable a high drawing rate, a high CR is desired. The fusion down-draw process has the capability to produce glass sheet having pristine surface quality without the need of further surface polishing. Therefore, this process is particularly advantageous for the production of glass substrates for use in making LCD display devices. The fusion down draw process requires the glass material have a relatively high liquidus viscosity, e.g., at least 10,000 poise.

However, it was found that a high cooling rate can impact the compaction in the glass sheet produced upon being reheated to an elevated temperature, e.g., the processing temperature of a typical low temperature polysilicon TFT fabrication process. The amount of compaction seen in reheating a drawn sheet depends on many factors besides the cooling rate, in particular the maximum temperature of the heat cycle, the duration of the heat cycle and ramp rate up and down from that temperature, the proximity of the maximum temperature to the glass transition temperature, etc.

Figure 2:
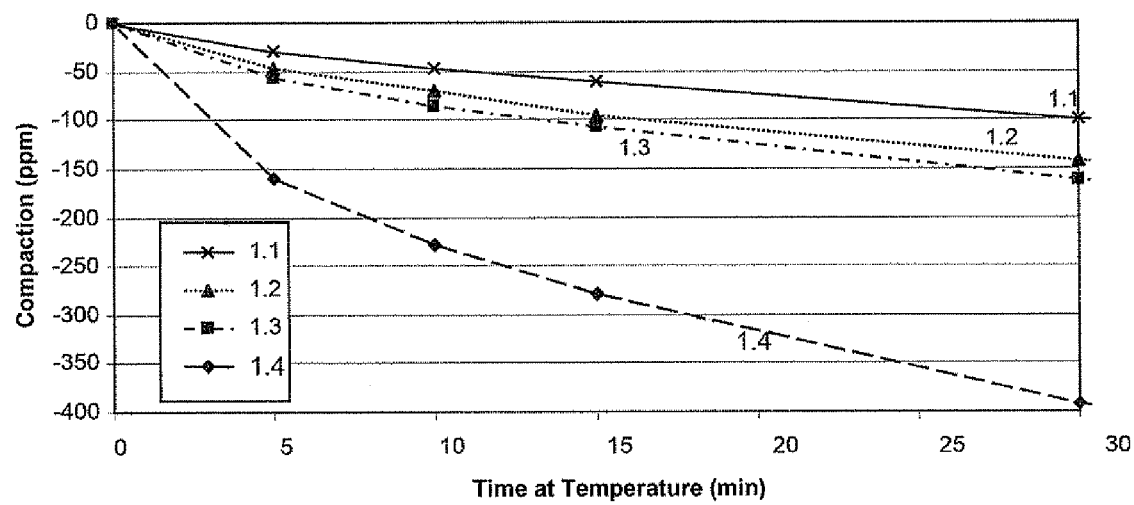
FIG. 2 is a diagram illustrating the relationship between the compaction of a glass sheet as a function of time held at 675° C. upon reheating to this temperature.

FIG. 2 shows the compaction of a series of glass sheets as a function of duration held at 675° C. in the re-heating process. In this figure, 1.1 is the curve for a glass sheet having an anneal point of 786° C., 1.2 for a glass sheet having an anneal point of 777° C., 1.3 for a glass sheet having an anneal point of 770° C., and 1.4 for a glass sheet having an anneal point of 720° C. It is clear that within a certain time limit, the longer the duration, the more compaction was observed. It is also clear from this figure that, the higher the anneal point of the glass of the glass sheet, the lower the compaction tends to be after a given duration at 675° C. Thus, to avoid compaction, it is useful to have the anneal point as high as reasonably achievable.

In practice, it is desired that the coefficient of thermal expansion be a reasonably close match to silicon itself or the performance of the TFTs will be compromised. Experience with AMLCD substrates teaches that a coefficient of thermal expansion less than $42\times10^{-7}$/° C. is desirable for AMLCD and low-temperature poly-Si applications.

The glass sheet made according to the present invention can advantageously have a composition comprising $SiO_2$ and $Al_2O_3$. In certain embodiments, the glass sheet may further comprise $B_2O_3$ in the composition thereof. $B_2O_3$ is believed to be beneficial to the liquidus viscosity of the glass for fusion draw. In other embodiments, the glass sheet may have a composition comprising $SiO_2$ and $Al_2O_3$, but is essentially free of $B_2O_3$. The advantages of $B_2O_3$ to the forming process mentioned above notwithstanding, it can reduce the anneal point of a $SiO_2$—$Al_2O_3$ glass. To achieve a high anneal point of the glass, it is desired in certain embodiments the composition thereof is essentially free of $B_2O_3$.

One aspect of the present invention is thus particularly directed to a process for making a glass substrate suitable for fabrication of low-temperature polysilicon (LPTS) TFT thereon. The process includes a step of providing a glass melt of a glass material having an anneal point of at least 765° C., subjecting the glass melt to a cooling step with a cooling rate of at least 5° C./s, in certain embodiments at least 8° C./s, in certain other embodiments at least 10° C./s, in certain other embodiments at least 15° C./s, in certain other embodiments at least 20° C./s, in certain other embodiments at least 30° C./s, in certain embodiments at least 40° C./s, in certain other embodiments at least 50° C./s, from a temperature $T_1$ corresponding to a viscosity of $1.0\times10^{10}$ poise to a temperature $T_2$ corresponding to a viscosity of $1.0\times10^{15}$ poise. The cooling step can be part of the forming process during which the glass melt is formed via, inter alia, the fusion down-draw process, into a glass sheet with desired thickness. The thus produced glass sheet would desirably have a measured CM675, where |CM675|≤175 ppm, measured according to the above described protocol.

This process for making glass substrates suitable for fabrication of LTPS TFT thereon thus would enable the production of such glass sheets without the need of further downstream surface polishing due to the high surface quality resulting from the fusion process. Moreover, it would also enable high-speed volume production of the glass sheet with sufficient compaction value without further down-stream anneal of the glass sheet. Anneal of glass sheet can be very expensive, and can damage the pristine surface quality of the glass. Therefore, the elimination of this step represents a huge advantage of the present invention. Nonetheless, even if a step of secondary anneal may be unnecessary according to certain embodiments of the present invention, it may be desired in certain embodiments to subject the glass sheet to a secondary anneal as long as the cost of this step is not prohibitive.

The present invention is further illustrated by the following non-limiting examples.

EXAMPLES

Example 1

A glass was made by conventional melting methods and formed into square patties at least 4"×4" in dimension and at least 1 mm thick. The patties were cut or ground and then polished into precise squares 4"×4" in area and about 1 mm thick or less. We refer to these as samples as sheets in what follows, though it should be obvious that "sheets" would also apply to sheets of glass obtained via rolling, slot draw or fusion. The sheet was placed in a furnace at a temperature corresponding to a viscosity of not lower than $1.0\times10^{10}$ poise for 5-10 minutes to reset the local atomic configurations to those in a supercooled liquid. After this time, the sample was removed from the furnace in such a way as to produce an average cooling rate of about 5° C./s or more down to the temperature corresponding to $1.0\times10^{15}$ poise. This reset the fictive temperature of the glass to a state comparable to that produced in fusion draw, slot draw, or rolling.

Example 2

After the sheet was cooled to room temperature at a rate of 5° C./s or higher, 4 fiducial lines were scribed ~0.5 inches in from the sample's edges. The X and Y coordinates of the intersections of these lines in each corner of the sample were located using a Mitutoyo Apex Vision System and were used to calculate the perimeter of the sample. As the sample was exposed to thermal treatments, the average change in the dimensions of the sample was captured by the changes in the perimeter as measured by the Mitutoyo Apex. This allowed for rapid and accurate measurement of the compaction of the sample (through averaging of multiple measurements and multiple samples) and resulted in an uncertainty of compaction values of roughly +/−2 or 3 ppm, allowing us to confidently evaluate and differentiate between various glass compositions.

Example 3

After the initial marks were made and the initial perimeter was determined, the glass sheet was subjected to the remaining steps for measuring CM675 according to the protocol described above. The cooling rate after the glass was held at 675° C. for about 30 minutes was deliberately chosen very high so as to preserve the geometry obtained at high temperature. One method for achieving high rates of cooling was to direct a fast stream of room-temperature air at all surfaces of the sheet after removing from a furnace via fans or jets of compressed air. The positions of the registry marks were re-measured. The CM675 value was then calculated according to the above described protocol.

For glass materials with sufficiently high anneal points, the change in registry positions may be very small, and so replicate measurements and/or heat treatments may be required to obtain statistically significant results. The evolution of compaction with respect to time at 675° C. is shown in FIG. 2 for four fusion-drawn glasses, and the benefits of higher anneal point are clearly observed.

Figure 3:
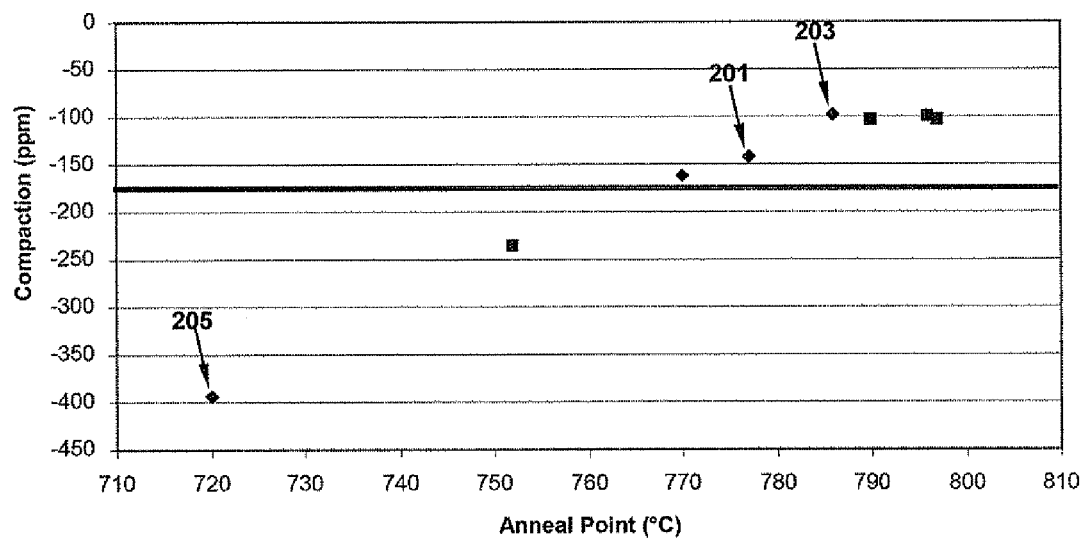
FIG. 3 is a diagram illustrating the relationship between the compaction of a series of glass sheets made of differing glass materials as a function of anneal point thereof.

A plurality of glass sheets were made and tested of CM675 as describe supra. Data are included in the graph of FIG. 3. From this figure, it is clear that, for glasses having an anneal point of higher than about 765° C., a |CM675|≤175 ppm was obtained. For those glasses having an anneal point of below about 765° C., DCM675|>175 ppm was observed. All glass sheet samples tested were subjected to a cooling rate of higher than 5° C./s, but lower than 20° C./s, when they were cooled from $1.0\times10^{10}$ poise to $1.0\times10^{15}$ poise. Glass sheets corresponding to data points 201 and 203 were found suitable for the LTPS fabrication process; whereas 205 was found unsuitable. Glasses corresponding to other data points above the 175 ppm compaction horizontal line than 201 and 203 are believed to be suitable for LTPS fabrication as long as the surface quality thereof is sufficient. A commercial glass sheet with the tradename Jade™, made according to the present invention and sold by Corning Incorporated, Corning, N.Y., U.S.A., with an anneal point of about 786° C., has a measured compaction DCM675|<175 ppm according to the measurement protocol described supra.

It will be apparent to those skilled in the art that various modifications and alterations can be made to the present invention without departing from the scope and spirit of the invention. Thus, it is intended that the present invention cover the modifications and variations of this invention provided they come within the scope of the appended claims and their equivalents.

What is claimed is:

1. A process for making a glass sheet, comprising the following steps;
    (A) providing a glass material having an anneal point of at least 765° C. and a CTE that is about $26\times10^{-7}$/° C., and not more than $42\times10^{-7}$/° C.;
    (B) heating the glass material to a temperature not lower than a temperature $T_1$ corresponding to a viscosity of $1.0\times10^{10}$ poise; and
    (C) cooling the glass material from $T_1$ to a temperature $T_2$ corresponding to a viscosity of $1.0\times10^{15}$ poise at a cooling rate of CR, wherein 5° C./s≤CR≤200° C./s,
    wherein the glass material upon completion of step (C) has a measured compaction CM675, wherein |CM675|≤175 ppm.

2. A process for making a glass sheet according to claim 1, wherein the glass sheet has a thickness of at most 1.5 mm.

3. A process for making a glass sheet according to claim 1, wherein the glass material is essentially free of alkali metal in the composition thereof.

4. A process for making a glass sheet according to claim 1, which comprises a fusion-draw process to form the glass sheet.

5. A process for making a glass sheet according to claim 1, wherein the glass material comprises $Al_2O_3$ and $SiO_2$ in the composition thereof.

6. A process for making a glass sheet according to claim 5, wherein the glass material further comprises $B_2O_3$ in the composition thereof.

7. A process for making a glass sheet according to claim 5, wherein the glass material is essentially free of $B_2O_3$ in the composition thereof.

8. A process for making a glass sheet according to claim 1, wherein the glass sheet has a thickness of a most 0.7 mm.

9. A process for making a glass sheet suitable for forming low-temperature polysilicon TFT thereon, comprising the following steps:
  (i) providing a glass melt at a viscosity of at most $1.0 \times 10^{10}$ poise of a glass material having an anneal point of at least 765° C. and a CTE that is, about $26 \times 10^{-7}$ and not more than $42 \times 10^{-7}$/° C.;
  (ii) cooling the glass melt from a temperature $T_1$ corresponding to a viscosity of $1.0 \times 10^{10}$ poise to a temperature $T_2$ corresponding to a viscosity of $1.0 \times 10^{15}$ poise at a cooling rate of CR, wherein 5° C./s≤CR≤200° C./s; and
  (iii) forming a glass sheet from the glass melt,
  wherein upon completion of steps (ii) and (iii), the glass sheet has a measured compaction CM675, wherein |CM675|≤175 ppm.

10. A process for making a glass sheet according to claim 9, wherein steps (ii) and (iii) are carried out at least partly simultaneously.

11. A process for making a glass sheet according to claim 9, wherein in step (i), the glass material provided comprises $SiO_2$ and $Al_2O_3$ in the composition thereof.

12. A process for making a glass sheet according to claim 11, wherein in step (i), the glass material provided further comprises $B_2O_3$ in the composition thereof.

13. A process for making a glass sheet according to claim 11, wherein in step (i), the glass material provided is free of $B_2O_3$ in the composition thereof.

14. A process for making a glass sheet according to claim 9, wherein in step (ii), CR≥10° C./s.

15. A process for making a glass sheet according to claim 9, wherein step (iii) comprises fusion drawing the glass melt into a glass sheet.

16. A process for making a glass sheet according to claim 15, which is without a secondary anneal step prior to the fabrication of TFT thereon.

17. A process for making a glass sheet according to claim 9, wherein the glass sheet has a thickness of a most 1.5 mm.

18. A process for making a glass sheet according to claim 9, wherein the glass sheet has a thickness of at most 0.7 mm.

* * * * *